(12) United States Patent
Agarwal et al.

(10) Patent No.: US 12,235,247 B1
(45) Date of Patent: Feb. 25, 2025

(54) EROSION TEST RIG FOR VARIABLE SPEED DUST IMPACT AT EXTREME TEMPERATURES

(71) Applicants: Arvind Agarwal, Miami, FL (US); Abhijith Kunneparambil Sukumaran, Miami, FL (US); Brandon A. Aguiar, Miami, FL (US); Cheng Zhang, Miami, FL (US)

(72) Inventors: Arvind Agarwal, Miami, FL (US); Abhijith Kunneparambil Sukumaran, Miami, FL (US); Brandon A. Aguiar, Miami, FL (US); Cheng Zhang, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 3 days.

(21) Appl. No.: 18/747,762

(22) Filed: Jun. 19, 2024

(51) Int. Cl.
  *G01N 3/56* (2006.01)
  *G01N 3/06* (2006.01)
(52) U.S. Cl.
  CPC ............ *G01N 3/567* (2013.01); *G01N 3/068* (2013.01); *G01N 2203/0226* (2013.01); *G01N 2203/0228* (2013.01)

(58) Field of Classification Search
  CPC ................ G01N 3/567; G01N 3/068; G01N 2203/0226; G01N 2203/0228
  See application file for complete search history.

(56) References Cited

U.S. PATENT DOCUMENTS

| | | | | |
|---|---|---|---|---|
| 3,709,026 A | * | 1/1973 | Rhodes | B64G 7/00 73/12.11 |
| 4,886,571 A | * | 12/1989 | Suzuki | C23C 16/455 118/724 |
| 2018/0172576 A1 | * | 6/2018 | Young | G01N 17/002 |

* cited by examiner

*Primary Examiner* — Tarun Sinha
(74) *Attorney, Agent, or Firm* — SALIWANCHIK, LLOYD & EISENSCHENK

(57) ABSTRACT

Erosion test rigs are provided for propelling dust and/or particles at high velocity and providing variable temperature ranges, as well as methods of using and fabricating the same. The erosion test rig can propel dust and/or particles at a velocity of up to 400 meters per second (m/s) and generate wide temperature ranges (e.g., from −196° C. to 200° C.) to simulate the harsh erosive conditions of planetary environments (e.g., Mars and Luna).

18 Claims, 16 Drawing Sheets

EROSION TEST RIG FOR VARIABLE SPEED DUST IMPACT AT EXTREME TEMPERATURES

GOVERNMENT SUPPORT

This invention was made with government support under 80MSFC21P0018 awarded by the National Aeronautics and Space Administration. The government has certain rights in the invention.

BACKGROUND

The interest and importance of studying the geographical, thermal, chemical, and mechanical properties of the atmospheres of the Moon and Mars have been on the surge lately since humanity is keen to explore them in search of life and habitat. Upcoming missions, such as Artemis I, II, III, Luna 25-29 and SELENE-III, indicate the relevance and need for these studies. However, space and planetary exploration come with various challenges, such as lack of air, large temperature gradients (such as from −250° C. (night) to 150° C. (day)), and the possibility of solar and intergalactic cosmic radiation and lunar dust that can impart damage to the materials as well as humans.

BRIEF SUMMARY

Embodiments of the subject invention provide novel and advantageous erosion test rigs for propelling dust and/or particles at high velocity and providing variable temperature ranges, as well as methods of using and fabricating the same. The erosion test rig can propel dust and/or particles at a velocity of up to 400 meters per second (m/s) and generate wide temperature ranges (e.g., from −196° C. to 200° C.) to simulate the harsh erosive conditions of planetary environments (e.g., Mars and Luna).

In an embodiment, a test rig for performing erosion testing on a sample can comprise: a main chamber; a propelling means disposed in the main chamber and configured to propel particles at a velocity of at least 200 m/s (e.g., at least 250 m/s, at least 300 m/s, at least 350 m/s, or at least 400 m/s); a sample holder disposed at a first end of the main chamber and configured to hold the sample in a path of the particles propelled by the propelling means; and a temperature regulation chamber disposed adjacent to the first end of the main chamber and configured to change a temperature of the sample. The temperature regulation chamber can be configured to cool the sample to a first temperature no greater than −196° C. and to heat the sample to a second temperature of at least 150° C. (e.g., at least 200° C., at least 215° C., or at least 218° C.). The propelling means can be a cold spray system comprising a convergent-divergent nozzle. The cold spray system can comprise compressed air (as the propelling media). The test rig can be configured to preheat the convergent-divergent nozzle of the cold spray system. The test rig can further comprise a camera disposed outside the main chamber and configured to record images of the particles and/or the sample. The main chamber can comprise at least one viewport (e.g., comprising a first viewport) made of a transparent material, and the camera can be disposed adjacent to the first viewport. The camera can be a high-speed camera configured to capture a minimum of 1,000,000 frames per second (FPS). The test rig can further comprise a vacuum system connected to a second end of the main chamber different from the first end of the main chamber. The vacuum system can be configured to remove a buildup of the particles from the main chamber. The sample holder can comprise, for example, a slab made of a rigid material (e.g., a metal, such as copper). The slab can be disposed between the main chamber and the temperature regulation chamber. The temperature regulation chamber can comprise: a container comprising liquid nitrogen and disposed adjacent to the sample holder, the container being configured to cool the sample to the first temperature; and/or a heating pad disposed on the sample holder, the heating pad being configured to heat the sample to the second temperature. The container can be made of, for example, aluminum. The heating pad can be attached to the sample holder by a thermal adhesive. The test rig can further comprise a thermocouple and/or a data logger assembly attached to a side of the main chamber. An input of the thermocouple can be connected to the sample holder such that the thermocouple and/or the data logger assembly is/are configured to monitor the temperature of the sample.

In another embodiment, a method for performing erosion testing on a sample can comprise: a) disposing the sample in a sample holder of a test rig that comprises a propelling means configured to propel particles at a velocity of at least 200 m/s (e.g., at least 250 m/s, at least 300 m/s, at least 350 m/s, or at least 400 m/s), the sample holder configured to hold the sample in a path of the particles propelled by the propelling means, a camera configured to record images of the particles, and a temperature regulation chamber disposed adjacent to the first end of the main chamber and configured to cool the sample to a first temperature no greater than −196° C. and to heat the sample to a second temperature of at least 150° C. (e.g., at least 200° C., at least 215° C., or at least 218° C.); b) propelling the particles at the sample at a velocity of at least 200 m/s using the propelling means; c) changing a temperature of the sample, using the temperature regulation chamber, by cooling the sample to the first temperature, heating the sample to the second temperature, or both; and d) capturing images, using the camera, of the particles, the sample, or both. The test rig can have any, all, or any combination of the features discussed herein (e.g., in the previous paragraph). The method can further comprise preheating the convergent-divergent nozzle of the cold spray system before propelling the particles at the sample. The method can further comprise monitoring the temperature of the sample using the thermocouple and/or the data logger assembly.

BRIEF DESCRIPTION OF DRAWINGS

FIG. 1A shows a PETR with integrated cold spray set up, camera (e.g., high speed camera), sample holder with base plate (e.g., copper base plate), and temperature regulation chamber for heating and cooling.

FIG. 2A shows a PETR with integrated cold spray set up.

FIG. 2B shows a container (e.g., aluminum (Al) container) for sample cooling with liquid nitrogen and air pressure regulator.

DETAILED DESCRIPTION

Figure 1A:
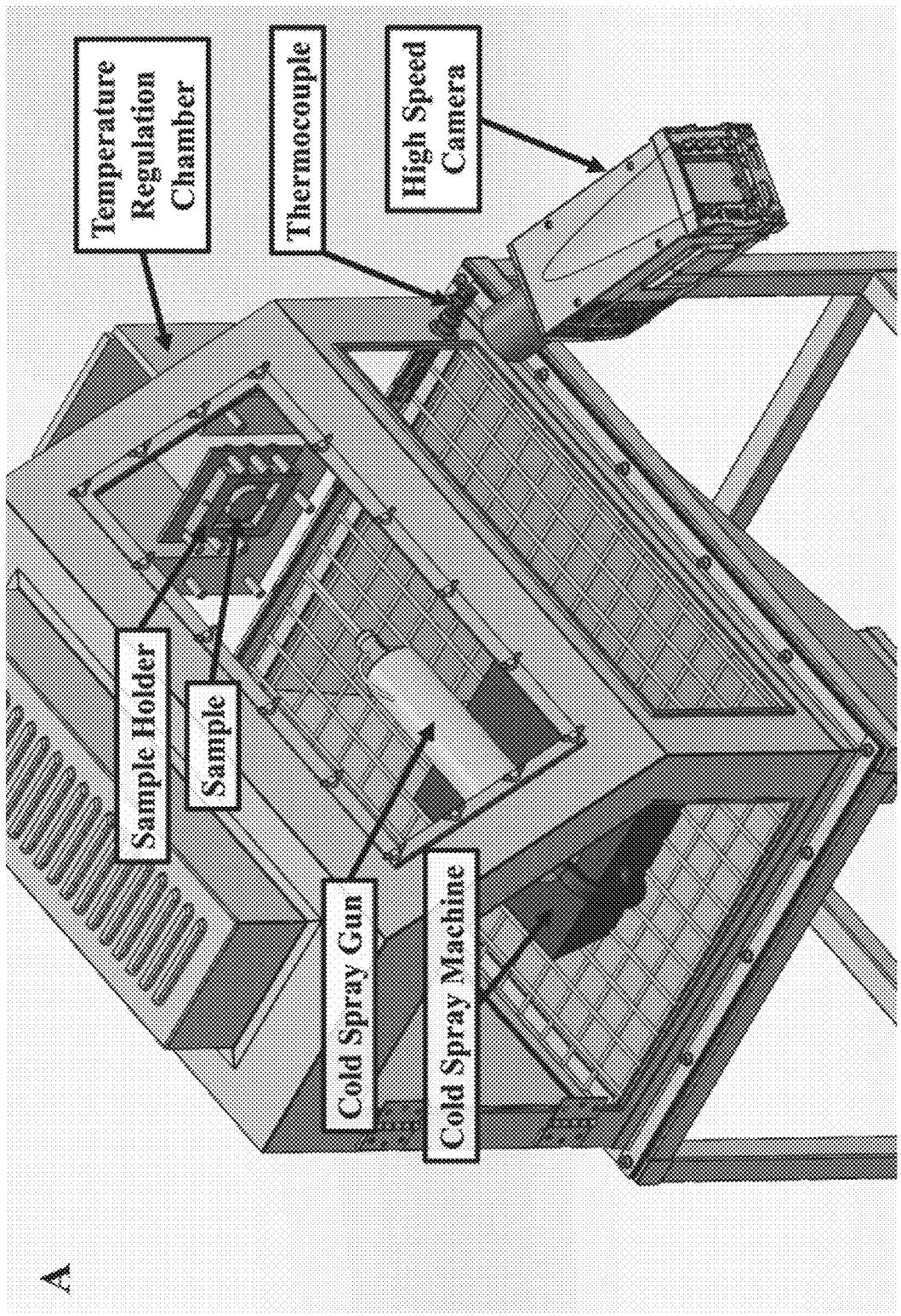
FIG. 1A shows a schematic view of a planetary erosion test rig (PETR), according to an embodiment of the subject invention.

Embodiments of the subject invention provide novel and advantageous erosion test rigs for propelling dust and/or particles at high velocity and providing variable temperature ranges, as well as methods of using and fabricating the same. The erosion test rig, which can be referred to herein as a planetary erosion test rig (PETR), can propel dust and/or particles at a velocity of up to 400 meters per second (m/s) and generate wide temperature ranges (e.g., from −196° C. to 200° C.) to simulate the harsh erosive conditions of planetary environments (e.g., Mars and Luna (which can be referred to herein as "the moon")).

Space and planetary exploration come with various challenges, including wide temperature gradients and the possibility of solar and intergalactic cosmic radiation and lunar dust that can impart damage to materials and humans. Lunar/Martian dust (regolith) is considered one of the most critical problems due to its sharp morphology and severe abrasive features. Lack of erosion by water or wind on the moon and on Mars results in the formation of very sharp particles that can act as severe abrasive entities. Some of the main problems encountered in past explorations include worn-off space suits during extravehicular activities, severe abrasion, and erosion resulting in the premature failures of mechanical parts like space vehicle frames, visors, shades, seals, fenders, and axles that are expected to last for years. The primary reason for this damage to the structural, optical, and fabric components is due to the high-velocity regolith impact because of planetary dust storms and rocket exhaust-plume impingement. The accelerated dust particles by storms/exhaust plumes can reach velocities from 100 m/s to as high as 2000 m/s. However, related art erosion test setups are not equipped to propel a large quantity (e.g., more than 50 grams (g)) of particles with very high velocities under simulated cold and hot planetary temperatures. Most related art erosion setups are merely sandblasting guns that use an aerosolized stream of particles that can reach velocities only up to 100 m/s. Embodiments of the subject invention overcome these limitations of related art erosion devices.

Related art erosion setups use sandblasting with impact velocity limited to no more than 100 m/s, do not provide variable temperature regimes of the moon, and do not provide visualization of particle-material interaction to understand erosion mechanisms. The PETR improves on related art erosion setups in many ways, including: using integrated portable low-pressure cold spray equipment setup to achieve high particle velocity (e.g., 300 m/s to 400 m/s) indicative of a dust storm on the surface of the moon; configured to mimic variable temperature regimes (e.g., 150° C. for a lunar day and −196° C. for a lunar night); having the capability to create impact of particles from 0-90 degrees, which is a true indicator of a lunar storm; and having a dedicated high-speed camera for impact velocity measurement and capturing in situ erosion/deformation mechanism.

Embodiments of the subject invention provide high velocity (e.g., 300 m/s to 400 m/s) dust/particle propelling devices that can provide variable temperature (e.g., −196° C. to 200° C.) ranges to resemble the harsh erosive conditions of planetary environments such as the moon and Mars. FIGS. 1A-1C, 2A-2E, 2G, 2H, and 7A-7C show various views and diagrams of a PETR according to an embodiment of the subject invention. An integrated portable cold spray gun can be used as the propelling means. The erodent particles can be fed through a converging-diverging nozzle to be accelerated up to the desired speeds. The PETR can be equipped with a customized sample holder-temperature modifier assembly to create variable temperature regimes. Low temperatures can be achieved by, for example, passing a cold substance (e.g., liquid nitrogen) through a container (e.g., a container box) disposed and/or attached to the sample holder. A heating pad with a temperature controller can be disposed on and/or attached to the sample holder assembly for high temperatures. The PETR can be equipped with a camera (e.g., a high speed camera, such as a state-of-the-art high-speed camera) to monitor the particle velocities inflight and particle-material interaction during impact to evaluate the deformation behavior for developing efficient dust-mitigation strategies.

The PETR can test the high-velocity impact resistance of metals and composite coatings (e.g., those developed in a plasma forming laboratory). The erosion test rig can include a sandblasting chamber with doors accessible on either side, as seen in FIG. 1A. The chamber can have an additional attachment of a compressed air supply, regulator, and/or a foot pedal system for air input (see also FIG. 2B). The chamber can have at least one viewport (such as two viewports (e.g., rectangular viewports) on the side and the top) for camera (e.g., high speed camera) positioning and impact visualization. The back side of the chamber can be attached to a vacuum system to eliminate any residual dust buildup in the system during and after erosion.

One door (e.g., the right-hand side door) of the chamber can be connected to a sample holder temperature unit assembly, which can include a slab comprising a rigid material (e.g., a metal such as copper). The thickness of the rigid material can be in a range of, for example, 0.1 inches to 2 inches (e.g., 0.25 inches). One side of the slab can have threaded holes to attach the sample holder to the chamber. The slab can include two fasteners (e.g., bolts) and a top and bottom to ensure the press fit of the samples against the slab backplate. The slab can be, for example, a square-shaped copper slab with two bolts and a top and bottom to ensure the press fit of the samples against the copper slab backplate (see also, e.g., FIGS. 1A, 1C, and 2D).

Figure 2A:
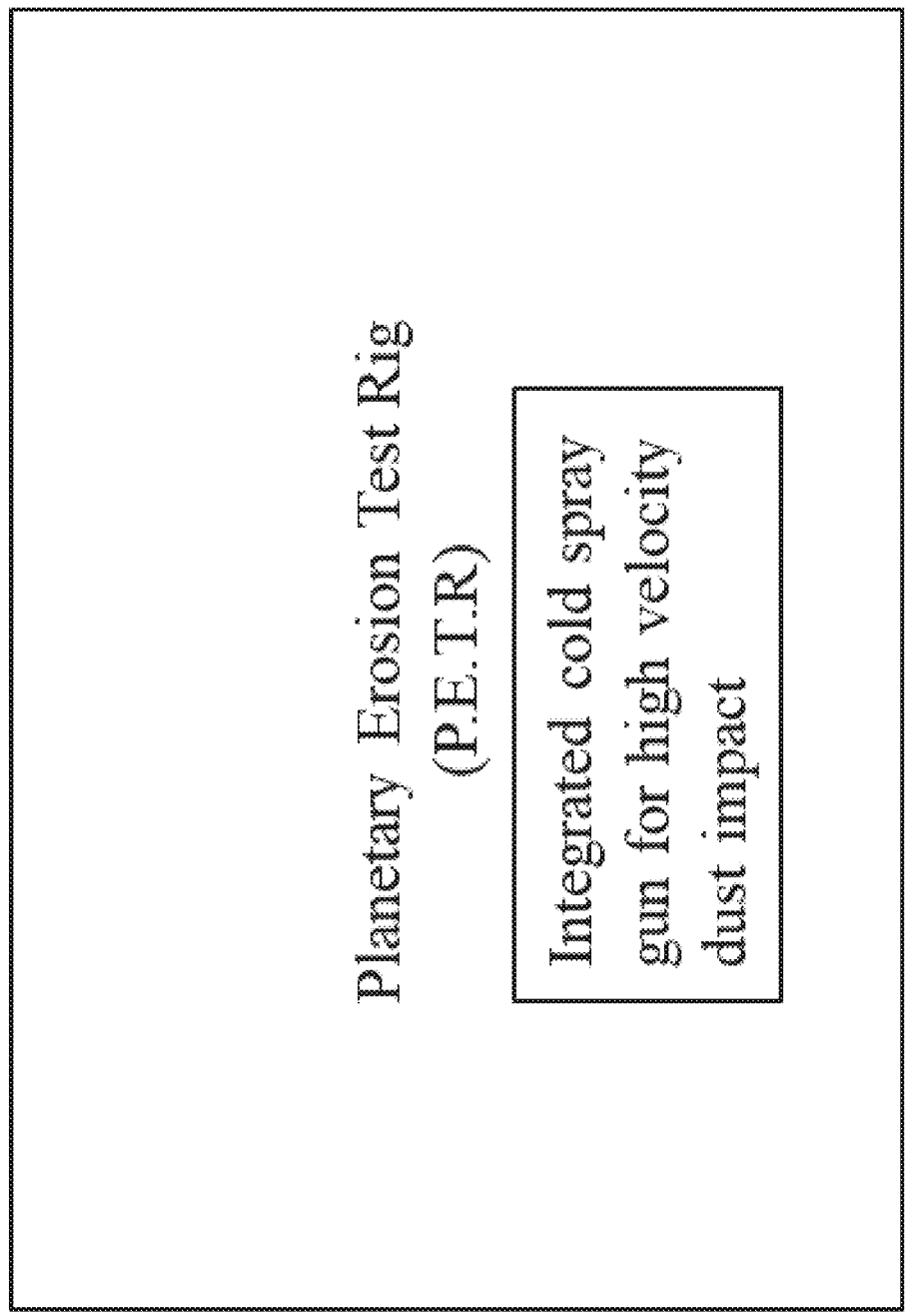
FIG. 2A shows a diagram of a PETR, according to an embodiment of the subject invention.
Figure 2B:
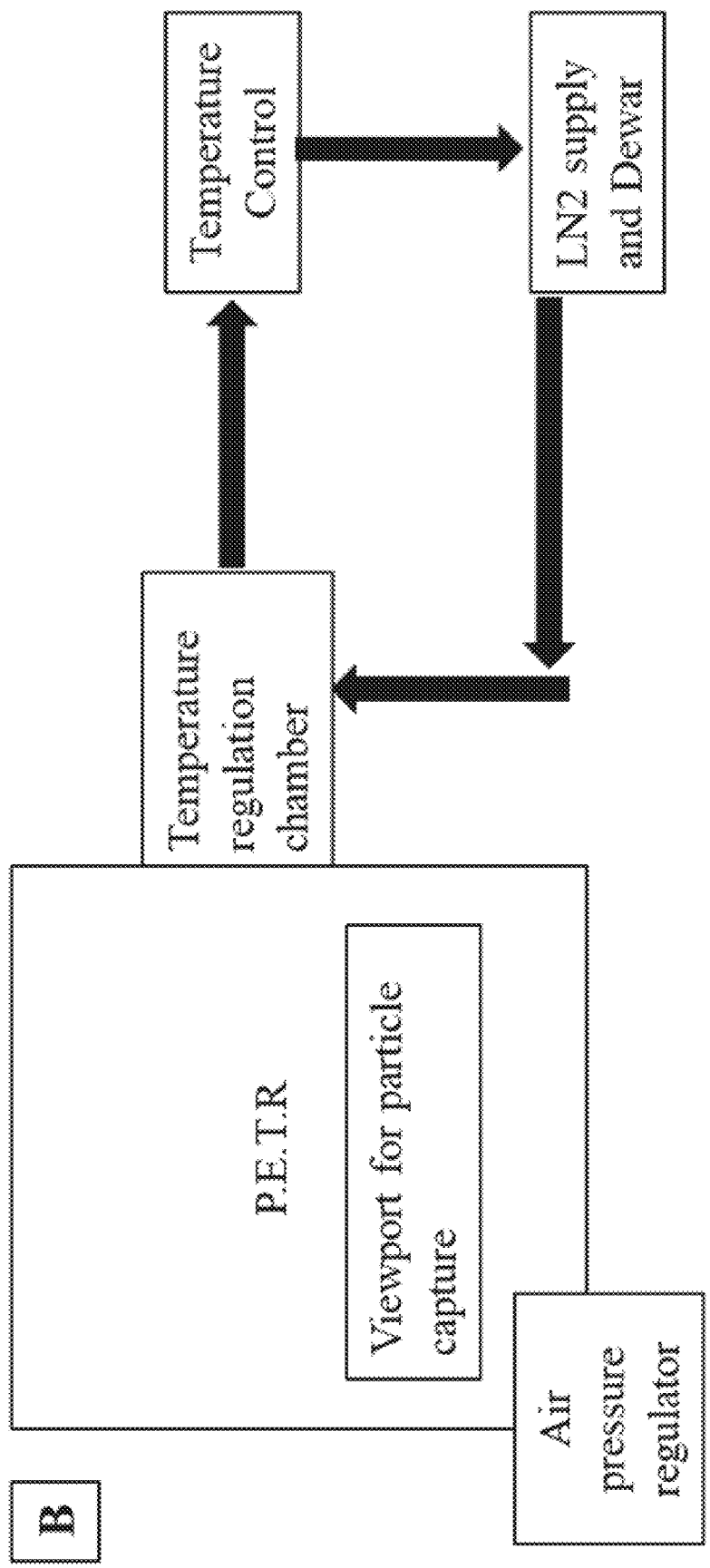
FIG. 2B shows a diagram of a front view of the PETR from FIG. 2A.
Figure 2C:
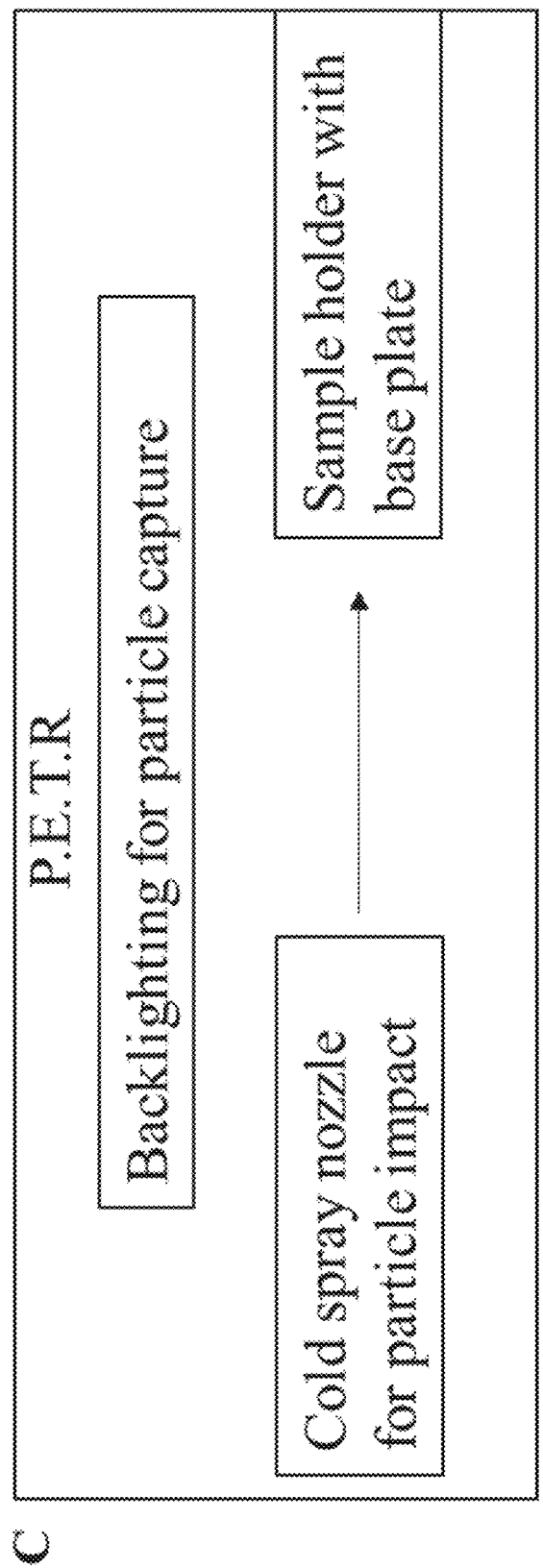
FIG. 2C shows a diagram of an inside view of a portion of the PETR from FIG. 2A, showing the cold spray nozzle, back lighting for particle capture, and sample holder with base plate.
Figures 2D, 2E:
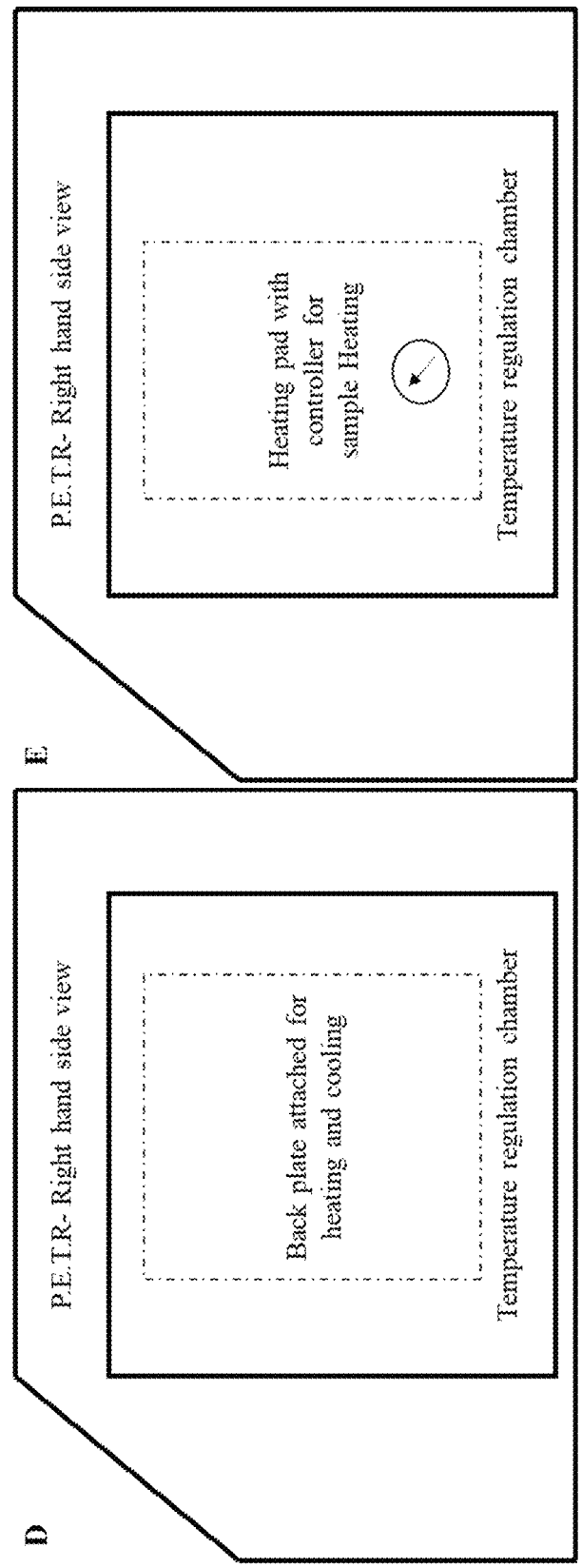
FIG. 2D shows a diagram of a portion of the PETR from FIG. 2A, showing the sample holder and baseplate attachment for temperature regulation.
FIG. 2E shows a diagram of a portion of the PETR from FIG. 2A, showing the heating pad with controller for sample heating.
Figure 2F:
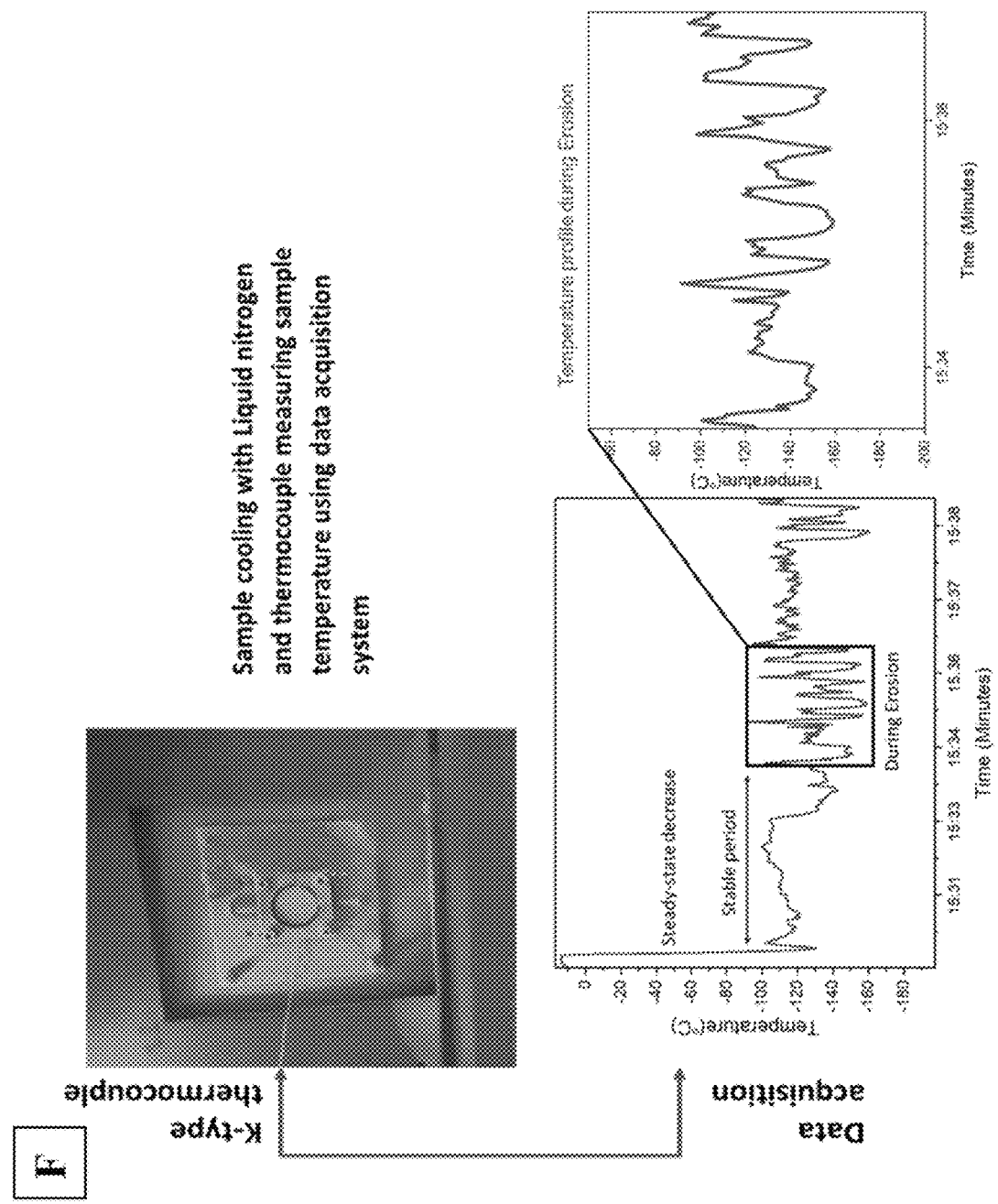
FIG. 2F shows an image (upper portion of FIG. 2F) of sample cooling by liquid nitrogen and in situ temperature measurement using K-type thermocouple and data acquisition system, along with a plot (bottom-left portion of FIG. 2F) of temperature (in ° C.) versus time (in minutes) during cooling. The plot on the bottom-right portion of FIG. 2F is an enlarged version of the box portion (during erosion) of the plot on the bottom-left portion of FIG. 2F.
Figures 2G, 2H:
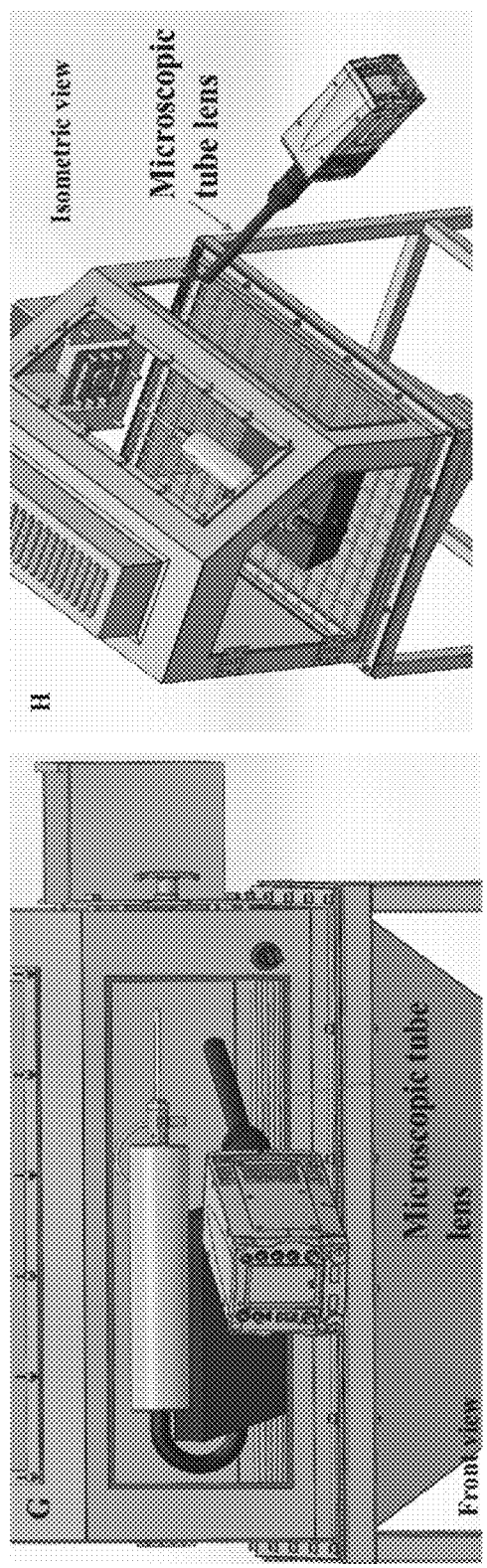
FIG. 2G shows a front view of a portion of a PETR, according to an embodiment of the subject invention, showing in situ particle deformation capture using a high speed camera microscopic tube lens.
FIG. 2H shows an isometric view of the high speed camera microscopic tube lens from FIG. 2G.

For low-temperature testing, a specially made container (e.g., an aluminum (Al) liquid nitrogen container) can be provided with a press fit outside the door of the backplate of the sample holder. A liquid nitrogen ($LN_2$) dewar can be used to fill the dedicated container to control the sample temperature. The temperature of the sample can be governed and regulated using a thermocouple (e.g., a K-type thermocouple) and data logger assembly, which can be attached to the back side of the chamber. The thermocouple input can be connected to the sample holder to monitor the temperature (see also, e.g., FIGS. 2B, 2F, and 7B).

For high-temperature testing, a heating pad (e.g., a 120 Volt (V), 720 Watt (W) silicone heating pad) with a controller (maximum working temperature of 218° C.) can be used for sample heating. The heating pad can be attached to the sample-mount-backplate assembly with a thermal adhesive (see also, e.g., FIGS. 2E and 7C). Temperature control can be achieved using a regulator with the heating pad, and the thermocouple (e.g., K-type thermocouple) and data logger assembly can monitor the sample temperature.

Figure 1B:
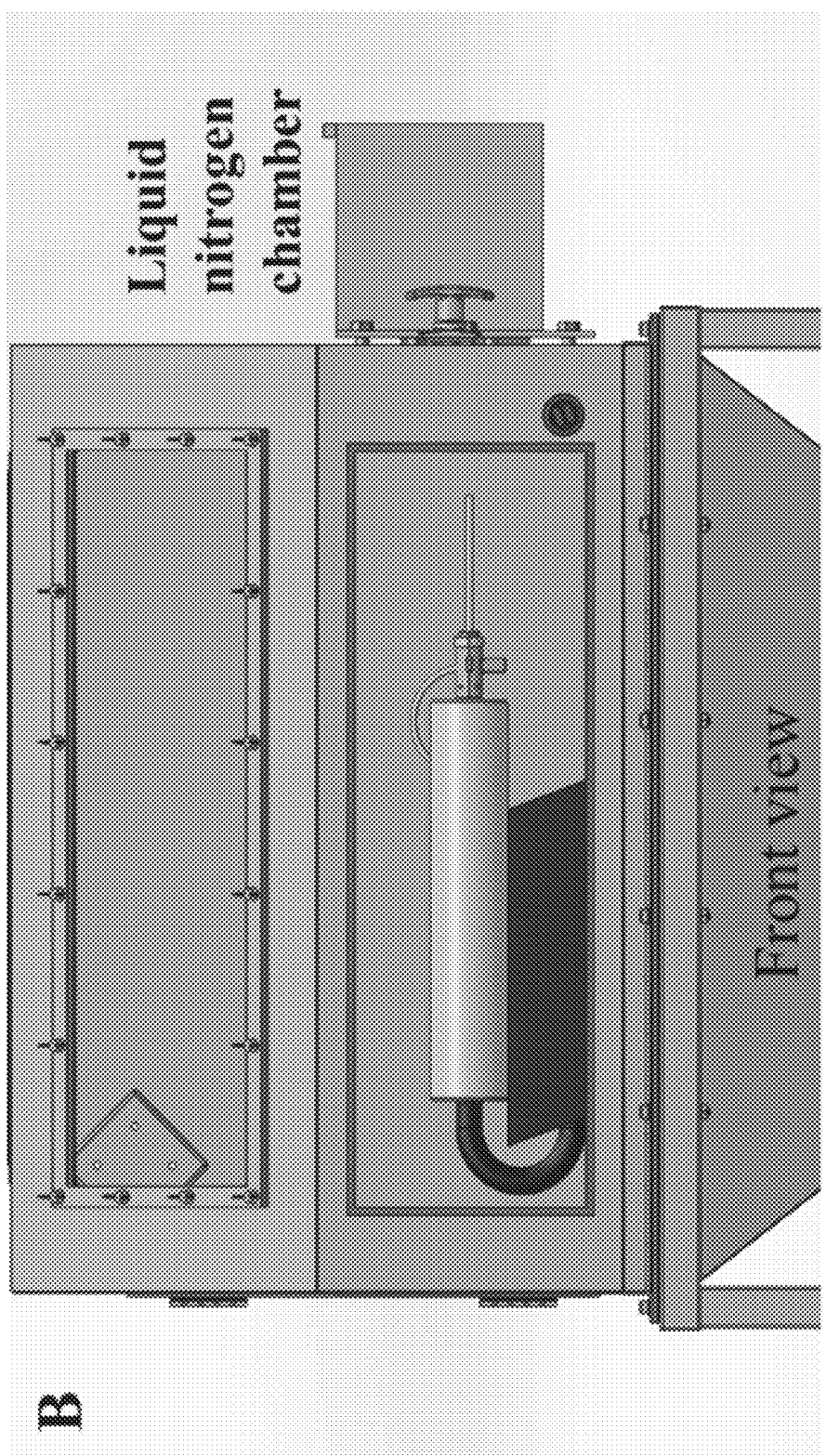
FIG. 1B shows a front view of the PETR from FIG. 1A.
Figure 1C:
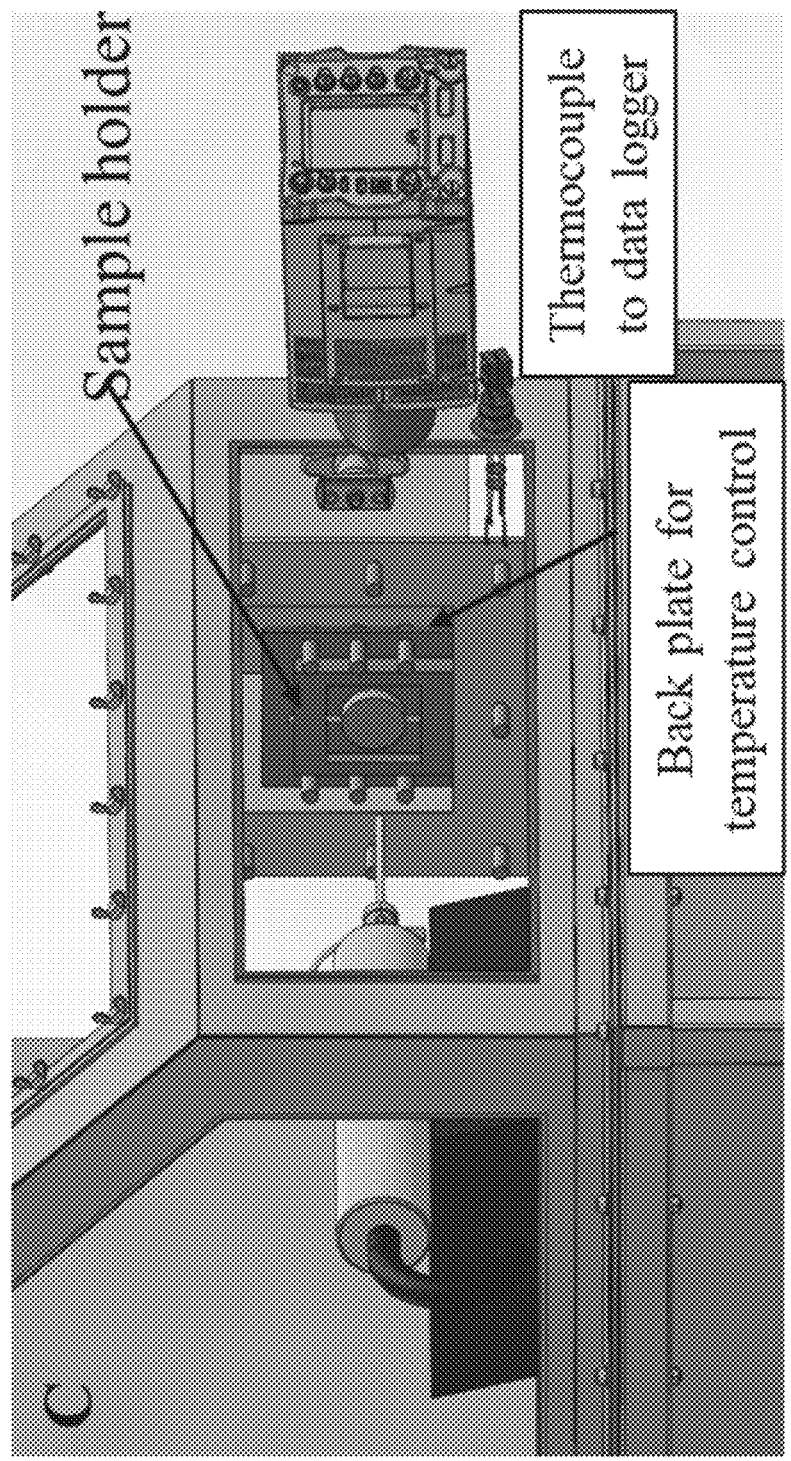
FIG. 1C shows an isometric view of the PETR from FIG. 1A, with a thermocouple integrated for temperature control.

The high-velocity impact of erodent particles can be achieved by using a portable cold spray system that uses compressed air as propelling media (see also, e.g., FIG. 1B). The particles can be fed to the erodent storage, and the nozzle can be preheated to achieve the necessary acceleration. The particles can be propelled with compressed air at high pressure through the convergent-divergent nozzle to accelerate the particles to obtain high velocities of up to 400 m/s.

Figure 3:
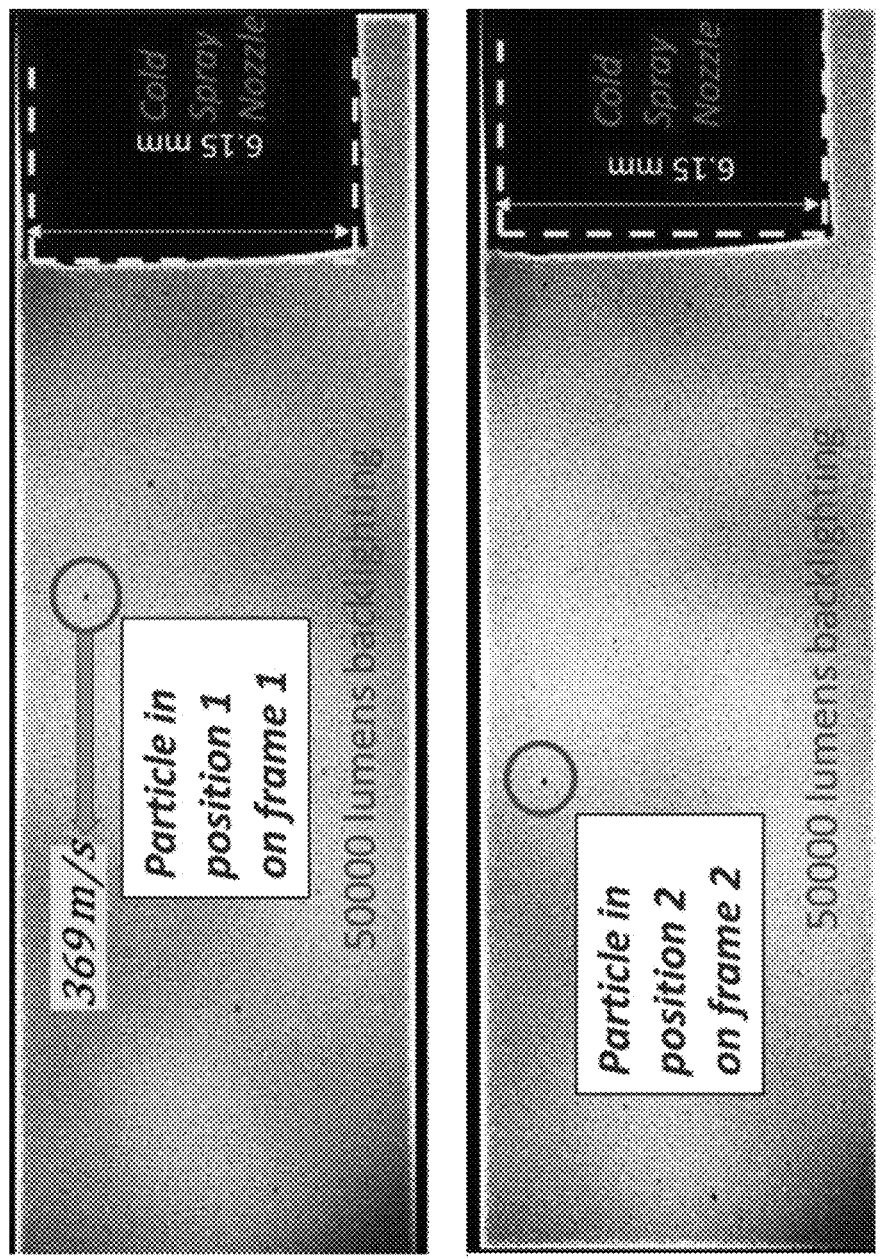
FIG. 3 shows a particle propelled by a cold spray nozzle and captured with a high speed camera at 100,000 frames per second (FPS) with a velocity of 369 meters per second (m/s). The velocity was calculated by dividing the distance traveled in two frames (0.00369 meters (m)) by the time between frames (0.00001 seconds(s)), which gives 369 m/s.

A high-speed camera with a million FPS configuration can be placed outside the viewport(s), with necessary ambient lighting of up to 50,000 lumens for the visualization of crodent particles. First, the propelled velocity from the nozzle can be calculated by capturing the particle's frame by frame. The ratio of distance traveled in frames to time in seconds gives the impact velocity (i.e., time in seconds= (number of frames particles traveled)/FPS; velocity of particle=(distance particle traveled)/(time in seconds). The distance traveled by a particle in different frames can be measured using the nozzle diameter as the scale. As seen in FIG. 3, an impact velocity of 369 m/s was obtained in a testing with Greenland anorthosite simulant particles. Greenland Anorthosite is a lunar highland simulant that represents the characteristic features of "lunar poles", a critical landing site in the upcoming Artemis missions. The high-speed camera can also be used to visualize the in-situ particle deformation behavior at the time of the impact with the material being tested. The particle-material deformation mechanism can be monitored and captured using the dedicated high-speed camera with a microscopic tube lens (see also, e.g., FIGS. 2G and 2H) to provide insights into material deformation behavior under high-velocity dust impacts.

In addition to the Greenland anorthosite lunar simulant, any Lunar and/or Martian regolith simulant (e.g., JSC-1A, MLS-1, Zircon, etc.) can be used as erodent particles to simulate storms of Lunar and Martian environments. The erosion test rigs of embodiments of the subject invention are flexible and can use any erodent with particle sizes as small as 0.5 μm and as large as 2 millimeters (mm). The erosion test rigs are not limited to planetary environments, but also have broader applications and can be used to simulate, for example, harsh dusty environments of oil rigs in Middle Eastern and African geographical areas where sandstorms are very common.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

A PETR as described herein and as seen in FIGS. 2A-2E and 7A-7C was used for erosion testing of aerospace grade $Ti_6Al_4V$ alloy using lunar regolith JSC-1A. Aerospace structural components are mostly made up of light weight metallic materials such as Al 6061, $Ti_6Al_4V$ alloys and high temperature sustaining polymer materials. Among these materials Ti alloy ($Ti_6Al_4V$) is the most common and hardest material used in lunar rover frames, wheels, sprockets and parts of landing systems. Hence, the erosion results of $Ti_6Al_4V$ alloy (hardness of 370 HV (Vickers Pyramid Number)) were used to demonstrate the ability of the PETR. It is noted that the PETR has a broader application and can be used for any materials, such as metals, polymers, ceramics, composite coatings, and any other parts that may need erosion testing. The erosion results on $Ti_6Al_4V$ showed two different erosion mechanisms, including pitting (material loss) and embedding (material addition) according to the velocity of particles, as discussed in more detail below.

Figure 4:
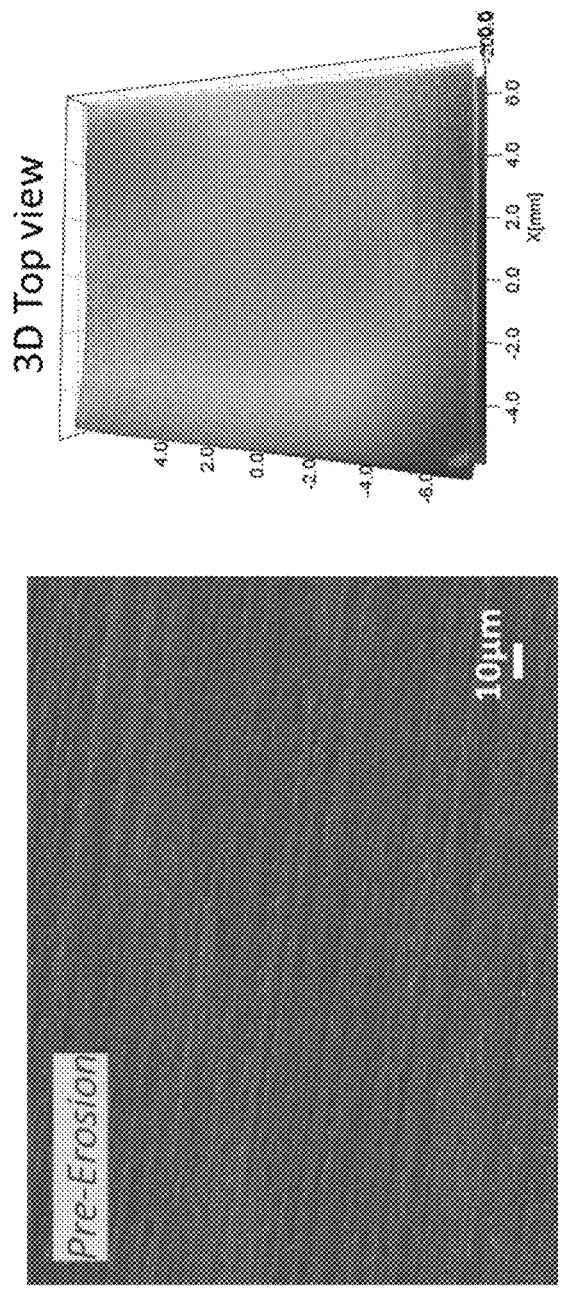
FIG. 4 shows microstructural (left) and profilometry (right) images of the pre-ersosion surface of a sample from a PETR, according to an embodiment of the subject invention.
Figure 5:
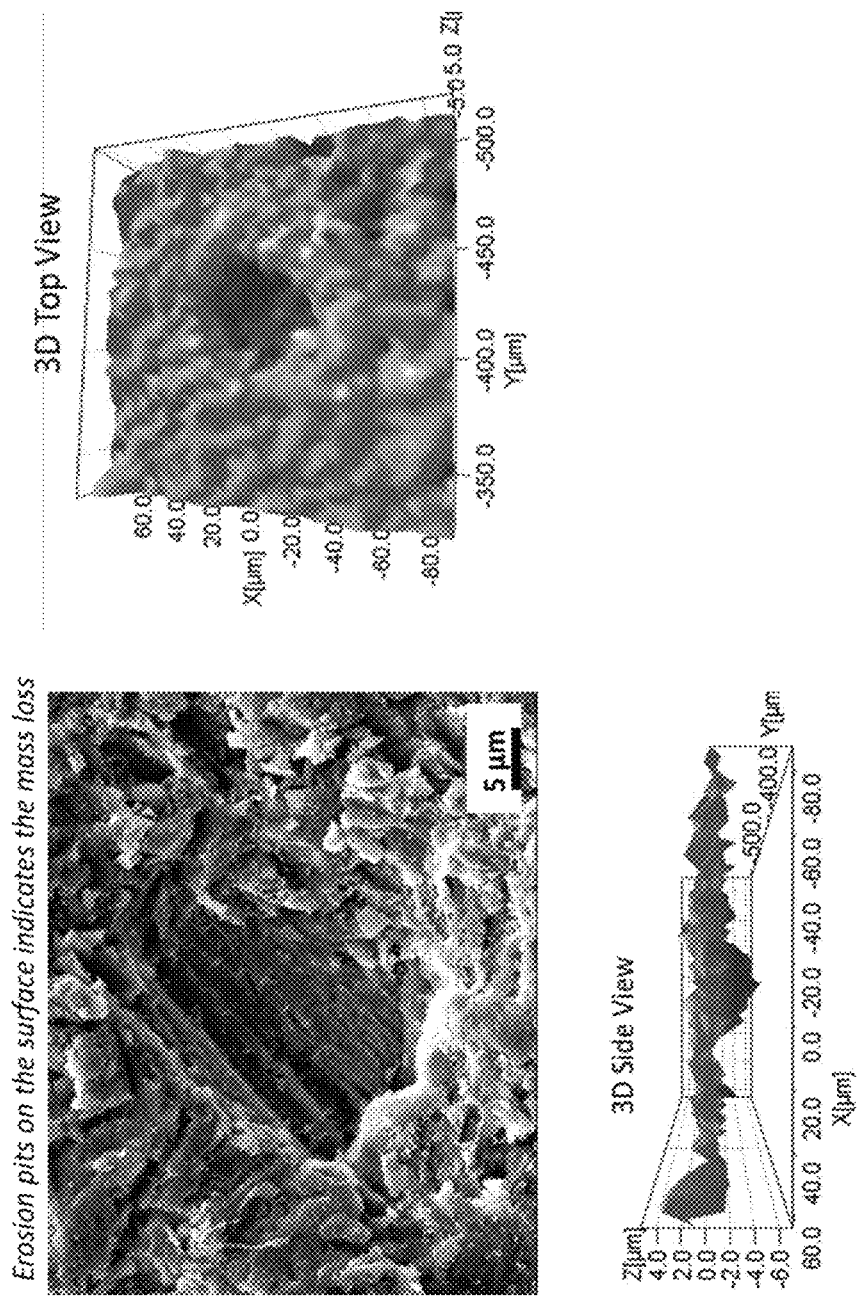
FIG. 5 shows mass loss with particle impingement post-erosion for the sample in FIG. 4. The erosion pits on the surface indicate the mass loss. The scale bar for the microscopic image on the top-left portion of FIG. 5 is 5 micrometers (μm).
Figure 6:
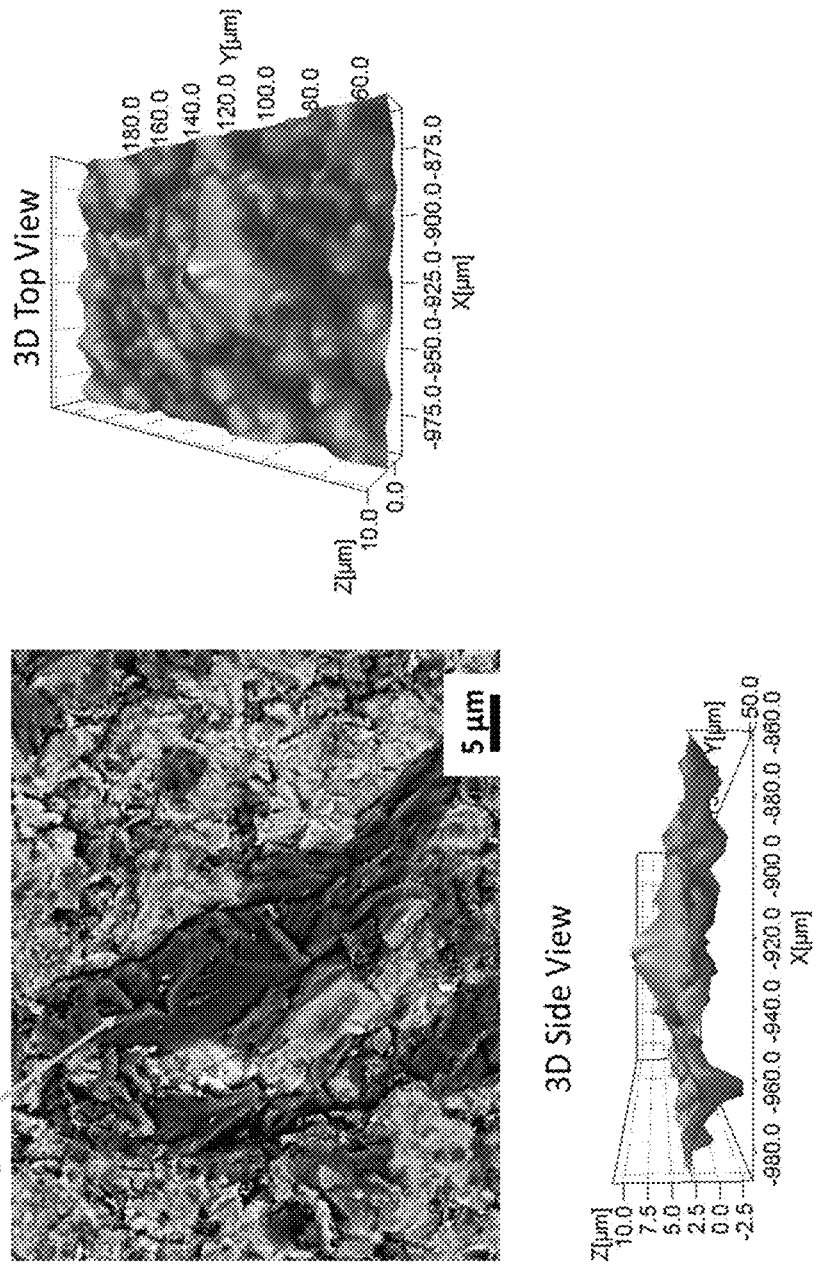
FIG. 6 shows microstructural and profilometry images of mass gain with particle embedding post-erosion for the sample in FIGS. 4 and 5. The embedding in particles on the surface indicates the mass gain. The scale bar for the microscopic image on the top-left portion of FIG. 6 is 5 μm.
Figure 7A:
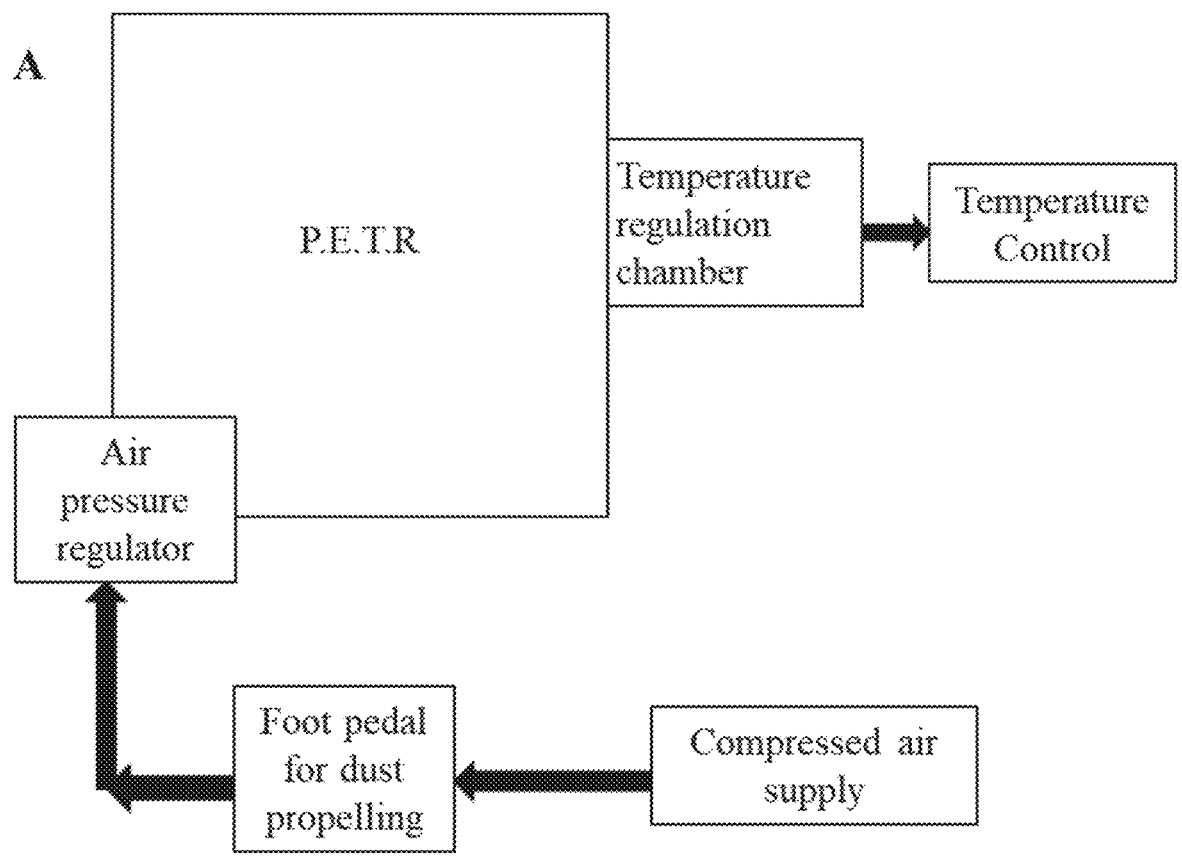
FIG. 7A shows a diagram of a PETR, according to an embodiment of the subject invention.
Figure 7B:
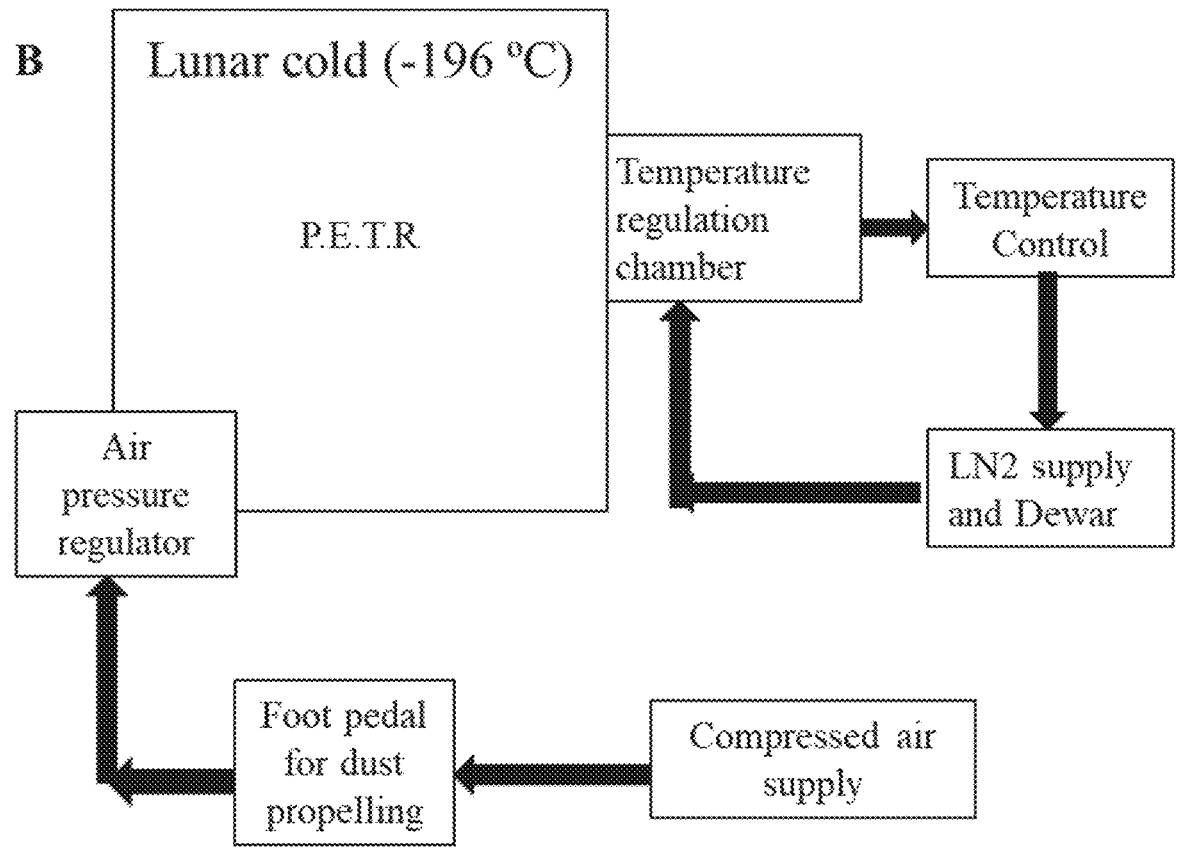
FIG. 7B shows a diagram of a portion of the PETR from FIG. 7A, showing the chamber in a cooling state, configured to reach a temperature as low as −196° C.
Figure 7C:
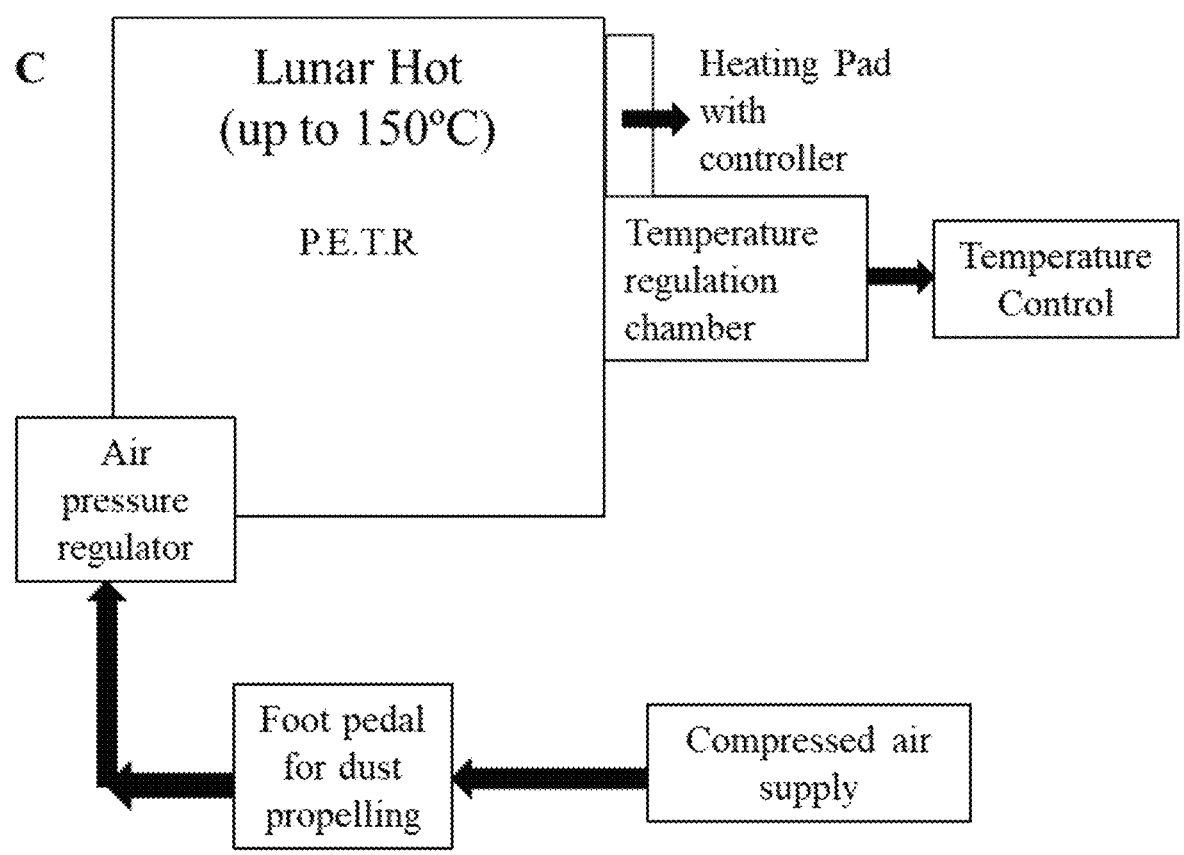
FIG. 7C shows a diagram of a portion of the PETR from FIG. 7A, showing the chamber in a heating state, configured to reach a temperature as high as 220° C. Though FIG. 7C lists a temperature of "up to 150° C.", the PETR is configured to actually reach a temperature as high as 220° C.

The impact velocity of erosion was measured using the dedicated high-speed camera, and the velocity function ranged between 60 m/s and 400 m/s based on impacting particle size. An example of the velocity calculation based on the distance traveled by the propelled particles captured using the high-speed camera is provided in FIG. 3 and the discussion of FIG. 3 in the Brief Description of the Drawings section. The microstructural and optical profilometry images of the $Ti_6Al_4V$ surface shows erosion mechanism such as erosion pits and particle embedding. Erosion pits indicate mass loss and are formed when impact velocity is less than critical. Conversely, the embedding of particles occurs when impact velocity exceeds the critical velocity. These results are shown in FIGS. 4-6.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A test rig for performing erosion testing on a sample, the test rig comprising:
   a main chamber;
   a propelling means disposed in the main chamber and configured to propel particles at a velocity of at least 300 meters per second (m/s);
   a sample holder disposed at a first end of the main chamber and configured to hold the sample in a path of the particles propelled by the propelling means; and
   a temperature regulation chamber disposed adjacent to the first end of the main chamber and configured to change a temperature of the sample,
   the temperature regulation chamber being configured to cool the sample to a first temperature no greater than −196° C. and to heat the sample to a second temperature of at least 150° C., the temperature regulation chamber comprising a container comprising liquid nitrogen and disposed adjacent to the sample holder, the container being configured to cool the sample to the first temperature, and
   the temperature regulation chamber further comprising a heating pad disposed on the sample holder, the heating pad being configured to heat the sample to the second temperature.

2. The test rig according to claim 1, the propelling means being a cold spray system comprising a convergent-divergent nozzle.

3. The test rig according to claim 2, the cold spray system comprising compressed air.

4. The test rig according to claim 2, the test rig being configured to preheat the convergent-divergent nozzle of the cold spray system.

5. The test rig according to claim 1, further comprising a camera disposed outside the main chamber and configured to record images of the particles, the sample, or both.

6. The test rig according to claim 5, the main chamber comprising a first viewport made of a transparent material, the camera being disposed adjacent to the first viewport.

7. The test rig according to claim 5, the camera being a high speed camera configured to capture a minimum of 1,000,000 frames per second.

8. The test rig according to claim 1, further comprising a vacuum system connected to a second end of the main chamber different from the first end of the main chamber, the vacuum system being configured to remove a buildup of the particles from the main chamber.

9. The test rig according to claim 1, the sample holder comprising a slab made of a rigid material, and
   the slab being disposed between the main chamber and the temperature regulation chamber.

10. The test rig according to claim 9, the rigid material being a metal.

11. The test rig according to claim 10, the metal being copper.

12. The test rig according to claim 1, the container being made of aluminum.

13. The test rig according to claim 1, the heating pad being attached to the sample holder by a thermal adhesive.

14. The test rig according to claim 1, further comprising a thermocouple and a data logger assembly attached to a side of the main chamber,
   an input of the thermocouple being connected to the sample holder such that the thermocouple and the data logger assembly are configured to monitor the temperature of the sample.

15. A method for performing erosion testing on a sample, the method comprising:
   disposing the sample in a sample holder of a test rig, the test rig comprising:
      a propelling means configured to propel particles at a velocity of at least 300 meters per second (m/s);
      the sample holder configured to hold the sample in a path of the particles propelled by the propelling means;
      a camera configured to record images of the particles; and
      a temperature regulation chamber disposed adjacent to the first end of the main chamber and configured to cool the sample to a first temperature no greater than −196° C. and to heat the sample to a second temperature of at least 150° C.;
   propelling the particles at the sample at a velocity of at least 200 m/s using the propelling means;
   changing a temperature of the sample, using the temperature regulation chamber, by cooling the sample to the first temperature, heating the sample to the second temperature, or both; and
   capturing images, using the camera, of the particles, the sample, or both,
   the propelling means being a cold spray system comprising a convergent-divergent nozzle,
   the cold spray system comprising compressed air,
   the camera being a high speed camera configured to capture a minimum of 1,000,000 frames per second,
   the temperature regulation chamber comprising a container comprising liquid nitrogen and disposed adjacent to the sample holder, the container being configured to cool the sample to the first temperature, and
   the temperature regulation chamber further comprising a heating pad disposed on the sample holder, the heating pad being configured to heat the sample to the second temperature.

16. The method according to claim 15, further comprising preheating the convergent-divergent nozzle of the cold spray system before propelling the particles at the sample.

17. The method according to claim 15, the test rig further comprising a thermocouple and a data logger assembly,
   an input of the thermocouple being connected to the sample holder, and the method further comprising monitoring the temperature of the sample using the thermocouple and the data logger assembly.

18. A test rig for performing erosion testing on a sample, the test rig comprising:
- a main chamber comprising a first viewport made of a transparent material;
- a cold spray system disposed in the main chamber and configured to propel particles at a velocity of at least 300 meters per second (m/s);
- a sample holder disposed at a first end of the main chamber and configured to hold the sample in a path of the particles propelled by the cold spray system;
- a temperature regulation chamber disposed adjacent to the first end of the main chamber and configured to change a temperature of the sample;
- a high speed camera disposed outside the main chamber adjacent to the first viewport and configured to record images of the particles, the sample, or both;
- a vacuum system connected to a second end of the main chamber different from the first end of the main chamber; and
- a thermocouple and a data logger assembly attached to a side of the main chamber, the temperature regulation chamber being configured to cool the sample to a first temperature no greater than −196° C. and to heat the sample to a second temperature of at least 150° C.,
- the cold spray system comprising a convergent-divergent nozzle and compressed air,
- the test rig being configured to preheat the convergent-divergent nozzle of the cold spray system,
- the high speed camera being configured to capture a minimum of 1,000,000 frames per second,
- the vacuum system being configured to remove a buildup of the particles from the main chamber,
- the sample holder comprising a slab made of a rigid metal,
- the slab being disposed between the main chamber and the temperature regulation chamber,
- the temperature regulation chamber comprising a container comprising liquid nitrogen and disposed adjacent to the sample holder, the container being configured to cool the sample to the first temperature,
- the temperature regulation chamber further comprising a heating pad disposed on the sample holder, the heating pad being configured to heat the sample to the second temperature,
- the heating pad being attached to the sample holder by a thermal adhesive, and
- an input of the thermocouple being connected to the sample holder such that the thermocouple and the data logger assembly are configured to monitor the temperature of the sample.

* * * * *